(12) United States Patent
Hiraguchi

(10) Patent No.: US 8,024,300 B2
(45) Date of Patent: Sep. 20, 2011

(54) IMAGE FORMING APPARATUS, IMAGE FORMING METHOD, AND STORAGE MEDIUM

(75) Inventor: Hiroki Hiraguchi, Kawasaki (JP)

(73) Assignee: Ricoh Company Limited, Tokyo (JP)

( * ) Notice: Subject to any disclaimer, the term of this patent is extended or adjusted under 35 U.S.C. 154(b) by 415 days.

(21) Appl. No.: 12/182,497

(22) Filed: Jul. 30, 2008

(65) Prior Publication Data
US 2009/0037473 A1  Feb. 5, 2009

(30) Foreign Application Priority Data
Jul. 30, 2007 (JP) .................. 2007-198059

(51) Int. Cl.
*G06F 17/30* (2006.01)
*G06F 15/00* (2006.01)
*G06K 1/00* (2006.01)
*G06K 9/00* (2006.01)

(52) U.S. Cl. ........ 707/662; 707/663; 707/664; 707/915; 358/3.28; 358/1.1; 358/1.9; 358/1.15; 358/1.16; 358/1.18; 382/100; 382/175; 382/179

(58) Field of Classification Search ............ 358/1.1, 358/1.9, 1.15, 1.16, 1.18, 3.28; 382/100, 382/175, 179; 707/662–664, 915
See application file for complete search history.

(56) References Cited

U.S. PATENT DOCUMENTS

| 6,434,343 | B1 * | 8/2002 | Kobayashi et al. | 399/8 |
|---|---|---|---|---|
| 6,446,091 | B1 * | 9/2002 | Noren et al. | 1/1 |
| 6,480,297 | B1 * | 11/2002 | Suzuki et al. | 358/1.16 |
| 6,795,210 | B1 * | 9/2004 | Fujiwara | 358/1.18 |
| 6,854,904 | B2 * | 2/2005 | Oshino et al. | 400/103 |
| 6,872,015 | B2 * | 3/2005 | Roosen et al. | 400/61 |
| 6,943,914 | B1 * | 9/2005 | Borchers | 358/1.6 |
| 7,042,593 | B2 * | 5/2006 | Matsushima | 358/1.9 |
| 7,081,964 | B2 * | 7/2006 | Takagi | 358/1.1 |
| 7,092,117 | B2 * | 8/2006 | Kageyama et al. | 358/1.18 |
| 7,145,679 | B2 * | 12/2006 | Hitaka | 358/1.15 |
| 7,148,989 | B2 * | 12/2006 | Hitaka | 358/1.16 |
| 7,202,962 | B2 * | 4/2007 | Roosen et al. | 358/1.15 |
| 7,483,162 | B2 * | 1/2009 | Matsushima | 358/1.15 |
| 7,692,819 | B2 * | 4/2010 | Yasukaga et al. | 358/3.28 |

(Continued)

FOREIGN PATENT DOCUMENTS

| JP | 2005-222372 | 8/2005 |
|---|---|---|
| JP | 2006-80939 | 3/2006 |
| JP | 2006-115020 | 4/2006 |

*Primary Examiner* — Frantz Coby
(74) *Attorney, Agent, or Firm* — Oblon, Spivak, McClelland, Maier & Neustadt, L.L.P.

(57) ABSTRACT

In an image forming apparatus, a first document manager stores image data in an image storage device, associates the image data with a first identifier, outputs the image data via an image output device when the first identifier is specified via an operation device, and deletes the image data from the image storage device when a first condition is satisfied. A second document manager associates the image data with a second identifier, outputs the second identifier via the image output device, and outputs the image data via the image output device when the second identifier is input via an image input device. The first document manager does not delete the image data from the image storage device and prohibits the operation device from specifying the first identifier when the image data is associated with both the first and second identifiers.

13 Claims, 13 Drawing Sheets

U.S. PATENT DOCUMENTS

| | | | |
|---|---|---|---|
| 7,710,596 B2* | 5/2010 | Shibao | 358/1.9 |
| 7,716,432 B2* | 5/2010 | Yoshiura et al. | 711/156 |
| 7,734,834 B2* | 6/2010 | Yamamura | 710/5 |
| 7,760,380 B2* | 7/2010 | Suwabe | 358/1.15 |
| 2005/0021497 A1* | 1/2005 | Kohno | 707/1 |
| 2008/0228788 A1* | 9/2008 | Kaneko | 707/100 |

* cited by examiner

FIG. 7A

| EID | FILE NAME | STATUS |
|---|---|---|
| 1 | F20070115_1.JPG | S7-1-2 |
| 2 | F20070115_2.JPG | S7-1-2 |
| 3 | F20070118_1.JPG | S7-1-1 |
| 4 | F20070118_2.JPG | S7-1-1 |
| 5 | F20070118_3.JPG | S7-1-1 |
| 6 | F20070118_4.JPG | S7-1-1 |
| 7 | F20070202_1.JPG | S7-2-2 |
| 8 | F20070202_2.JPG | S7-2-2 |
| 9 | F20070214_1.JPG | S7-1-1 |
| 10 | F20070214_2.JPG | S7-1-1 |

FIG. 7B

| FID | DOCUMENT NAME | EID | SELECTABILITY | TIME REMAINING |
|---|---|---|---|---|
| 1 | GRADE REPORT FORMAT | 1, 2 | 1 | 20 |
| 2 | CONFERENCE MINUTES | 3, 4, 5, 6 | 1 | 30 |
| 3 | REFERENCES | 7, 8 | 0 | 0 |
| 4 | DRAWINGS | 10, 11 | 1 | 40 |

FIG. 8

| PID | EID | PARENT PID | BID | JID | PRINT SETTING |
|---|---|---|---|---|---|
| 1 | 1 | - | 1 | 1 | DUPLEX PRINT, PUNCH |
| 2 | 2 | - | 1 | 1 | DUPLEX PRINT, PUNCH |
| 3 | 1 | - | 2 | 1 | DUPLEX PRINT, PUNCH |
| 4 | 2 | - | 2 | 1 | DUPLEX PRINT, PUNCH |
| 5 | 1 | 1 | 3 | 2 | ONE SIDED PRINT, STAPLE |
| 6 | 2 | 2 | 3 | 2 | ONE SIDED PRINT, STAPLE |
| 7 | 1 | 3 | 4 | 2 | ONE SIDED PRINT, STAPLE |
| 8 | 2 | 4 | 4 | 2 | ONE SIDED PRINT, STAPLE |
| 9 | 9 | - | 7 | 5 | ONE SIDED |
| 10 | 10 | - | 7 | 5 | ONE SIDED |

| PID | EID | PARENT PID | BID | JID | PRINT SETTING |
|-----|-----|------------|-----|-----|---------------|
| 1   | 1   | -          | 1   | 1   | DUPLEX PRINT, PUNCH |
| 2   | 2   | -          | 1   | 1   | DUPLEX PRINT, PUNCH |
| 3   | 1   | -          | 2   | 1   | DUPLEX PRINT, PUNCH |
| 4   | 2   | -          | 2   | 1   | DUPLEX PRINT, PUNCH |
| 5   | 1   | 1          | 3   | 2   | ONE SIDED PRINT, STAPLE |
| 6   | 2   | 2          | 3   | 2   | ONE SIDED PRINT, STAPLE |
| 7   | 1   | 3          | 4   | 2   | ONE SIDED PRINT, STAPLE |
| 8   | 2   | 4          | 4   | 2   | ONE SIDED PRINT, STAPLE |

IMAGE FORMING APPARATUS, IMAGE FORMING METHOD, AND STORAGE MEDIUM

CROSS-REFERENCE TO RELATED APPLICATION

The present application is based on and claims priority from Japanese Patent Application No. 2007-198059, filed on Jul. 30, 2007 in the Japan Patent Office, the entire contents of which are hereby incorporated herein by reference.

BACKGROUND OF THE INVENTION

1. Field of the Invention

Exemplary aspects of the present invention relate to an image forming apparatus, an image forming method, and a storage medium, and more particularly, to an image forming apparatus, an image forming method, and a storage medium for efficiently reprinting an image.

2. Description of the Related Art

A related-art image forming apparatus, such as a copier, a facsimile machine, a printer, or a multifunction printer having at least one of copying, printing, scanning, and facsimile functions, typically forms an image on a recording medium (e.g., a sheet) based on image data.

In recent years, copiers have come to include a function of printing an image based on original image data read by a scanner, and a printer or a facsimile machine includes a function of printing image data input by an external device. In addition, a MFP (multi function peripheral) combining the above functions has been provided.

Specifically, one known related-art image forming apparatus stores image data in a storage device such as a HDD or the like and prints the stored image data according to an instruction given by a user using a control panel or the like. Therefore, the image forming apparatus may efficiently choose a document from documents stored in a storage device to print or delete the document.

Another known related-art image forming apparatus detects a two-dimensional bar code applied to an original document, decodes command information encoded in the detected bar code, and determines processing according to the decoded command information. Yet another known related-art image forming apparatus decodes information about an access to a web server from two-dimensional bar code information included in read image data, acquires contents data based on the decoded information, and prints the contents data.

The above two image forming apparatuses may read a mark such as a two-dimensional bar code embedded with various types of information from an original document and control printing and the like based on the embedded information. Generally, when an image forming apparatus stores image data in a storage device and prints the image data by operation of a control panel and the like, the image data is stored when input. By contrast, when the image forming apparatus reads a mark from an original document and controls printing and the like based on information embedded in the mark, the image data is stored when output. Thus, when the image forming apparatus has both functions, the above difference in timing of storing the image data may cause complicated processing of the image forming apparatus.

Obviously, such difference in the timing of storing the image data is undesirable, and accordingly, there is a need for a technology to efficiently printing image data after storing the image data in a storage device and printing image data by reading a mark applied to an original document.

BRIEF SUMMARY OF THE INVENTION

This specification describes an image forming apparatus according to exemplary embodiments of the present invention. In one exemplary embodiment of the present invention, the image forming apparatus includes an image input device, an image storage device, an image output device, an operation device, a first document manager, and a second document manager. The image input device is configured to input image data. The image storage device is configured to store the image data. The image output device is configured to output the image data. The operation device is configured to command control of the image data. The first document manager is configured to store the image data input by the image input device in the image storage device, associate the image data stored in the storage device with a first identifier, output the image data associated with the first identifier via the image output device when the first identifier is specified via the operation device, and delete the image data associated with the first identifier from the image storage device when a first condition is satisfied. The second document manager is configured to associate the image data to be output by the image output device with a second identifier, output the second identifier applied to the image data via the image output device, and output the image data associated with the second identifier via the image output device when the second identifier is input via the image input device. The first document manager does not delete the image data from the image storage device and prohibits the first identifier from being specified via the operation device when the image data is associated with both the first identifier and the second identifier.

This specification further describes an image forming method according to exemplary embodiments of the present invention. In one exemplary embodiment of the present invention, the image forming method includes inputting image data, storing the image data, outputting the image data, commanding control of the image data, performing a first control, and performing a second control. Performing the first control includes storing the input image data, associating the stored image data with a first identifier, outputting the image data associated with the first identifier when the first identifier is specified by commanding control of the image data, and deleting the image data associated with the first identifier when a first condition is satisfied. Performing the second control includes associating the output image data with a second identifier, outputting the second identifier applied to the image data, and outputting the image data associated with the second identifier when the second identifier is input. The image forming method does not delete the image data associated and stored with the first identifier and prohibits the first identifier from being specified by commanding control of the image data when the image data is associated with both the first identifier and the second identifier.

This specification further describes a computer readable storage medium according to exemplary embodiments of the present invention. In one exemplary embodiment of the present invention, the computer readable storage medium having recorded thereon computer readable program code for, when executed on a computer system, carrying out a control method including inputting image data, storing the image data, outputting the image data, commanding control of the image data, performing a first control, and performing a second control. Performing the first control includes storing the input image data, associating the stored image data with a first identifier, outputting the image data associated with the first identifier when the first identifier is specified by commanding control of the image data, and deleting the image data associated with the first identifier when a first condition is satisfied. Performing the second control includes associating the output image data with a second identifier, outputting the second identifier applied to the image data, and outputting the image data associated with the second identifier when the second identifier is input. The control method does not delete the image data associated and stored with the first identifier and prohibits the first identifier from being specified by commanding control of the image data when the image data is associated with both the first identifier and the second identifier.

BRIEF DESCRIPTION OF THE DRAWINGS

A more complete appreciation of the invention and the many attendant advantages thereof will be more readily obtained as the same becomes better understood by reference to the following detailed description when considered in connection with the accompanying drawings, wherein:

FIG. 7A is an image management table stored in an ID memory included in the image forming apparatus shown in FIG. 6;

FIG. 7B is a document management table stored in the ID memory;

FIG. 8 is an ID management table stored in the ID memory;

DETAILED DESCRIPTION OF THE INVENTION

Figure 1:
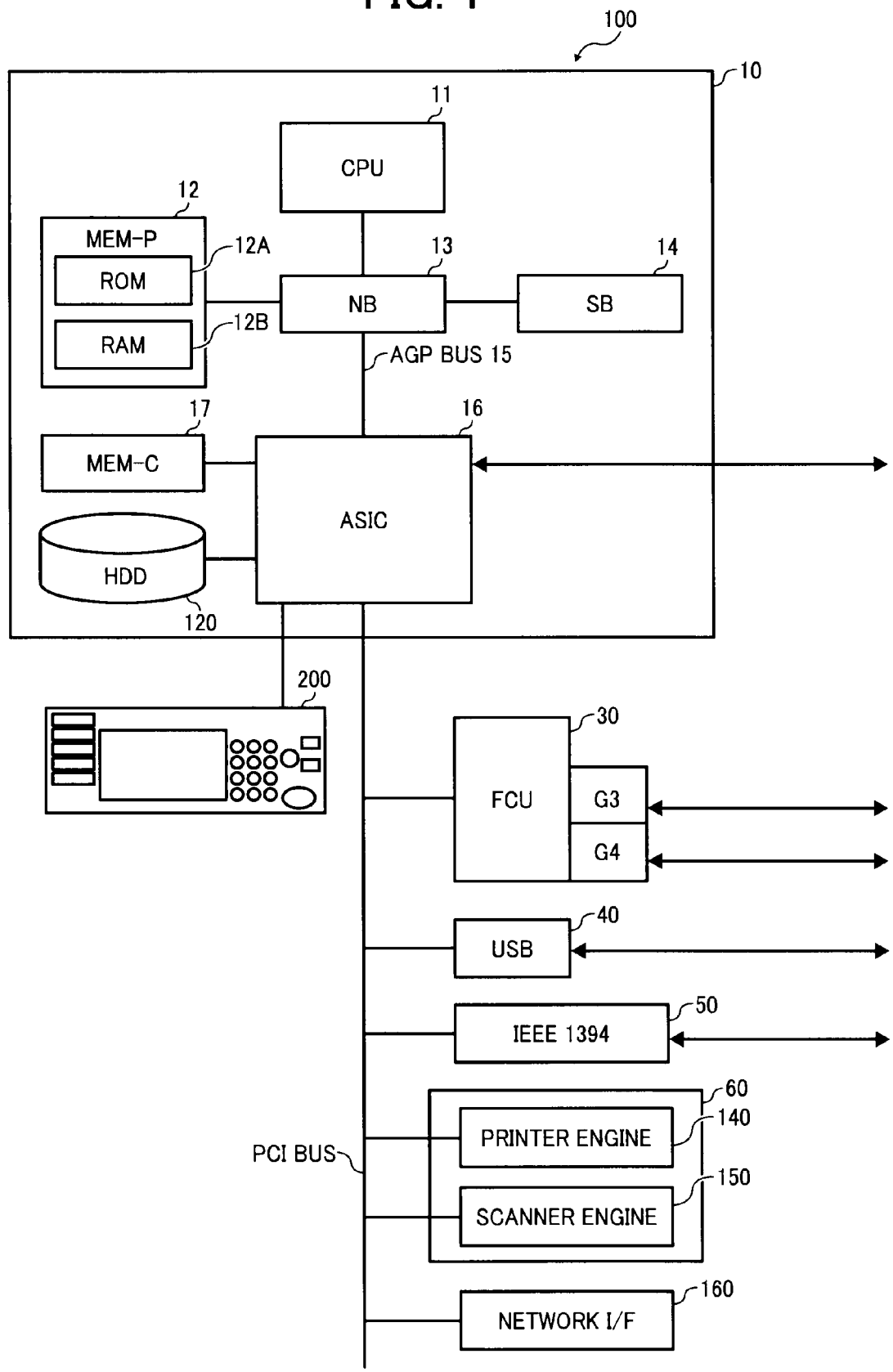
FIG. 1 is a diagram of a hardware configuration of an image forming apparatus according to an exemplary embodiment of the present invention.

In describing exemplary embodiments illustrated in the drawings, specific terminology is employed for the sake of clarity. However, the disclosure of this specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, in particular to FIG. 1, an image forming apparatus 100 according to an exemplary embodiment of the present invention is described.

Referring to FIG. 1, a description is now given of a hardware configuration of the image forming apparatus 100. FIG. 1 is a diagram illustrating the hardware configuration thereof. The image forming apparatus 100 includes a controller 10, an engine 60, a FCU (fax control unit) 30, a USB (universal serial bus) 40, an IEEE1394 (the Institute of Electrical and Electronics Engineers 1394) interface 50, a network I/F (interface) 160, and a control panel 200. The controller 10 includes a CPU (central processing unit) 11, a NB (north bridge) 13, a MEM-P (system memory) 12, a SB (south bridge) 14, an AGP (accelerated graphics port) bus 15, a MEM-C (local memory) 17, an ASIC (application specific integrated circuit) 16, and a HDD (hard disc drive) 120. The MEM-P 12 includes a ROM (read only memory) 12A and a RAM (random access memory) 12B. The engine 60 includes a printer engine 140 and a scanner engine 150.

The image forming apparatus 100 may be a copier, a facsimile machine, a printer, a multifunction printer having at least one of copying, printing, scanning, and facsimile functions, or the like.

The controller 10 is connected to the engine 60 via a PCI (peripheral component interconnect) bus, exercises overall control of the image forming apparatus 100, and controls drawing, communication, and input from the control panel 200. The printer engine 140 and the scanner engine 150 may be connected to the PCI bus. For example, the printer engine 140 may be a monochrome plotter, one drum color plotter, four drum color plotter, a scanner unit, or a facsimile unit. In addition to the above engines, the engine 60 also includes an image processing member for random dithering, gamma conversion, and the like.

The printer engine 140 is one example of an image output device. The scanner engine 150 is one example of an image input device. The control panel 200 is one example of an operation device.

The NB 13 is connected to the ASIC 16 via the AGP bus 15.

The CPU 11, which exercises overall control of the image forming apparatus 100, includes a chipset including the NB 13, the MEM-P 12, and the SB 14, and is connected to other devices via the chipset.

The NB 13 is a bridge for connecting the CPU 11, the MEM-P 12, the SB 14, and the AGP bus 15 with each other, and includes a memory controller for controlling reading and writing to the MEM-P 12, a PCI master, and an AGP target.

The MEM-P 12 is a system memory used as a memory for storing a program and data, a memory for developing a program and data, a memory for drawing by a printer, and the like. The ROM 12A is a memory only for reading and used as a memory for storing a program and data, while the RAM 12B is a writable and readable memory used as a memory for developing a program and data, a memory for drawing by a printer, and the like.

The SB 14 is a bridge for connecting the NB 13, a PCI device, and other peripheral devices with each other. The SB 14 is connected to the NB 13 via the PCI bus to which the network I/F 160 and the like, are connected.

The ASIC 16 is an IC (integrated circuit) including a hardware element for image processing and functions as a bridge for connecting the AGP bus 15, the PCI bus, the HDD 120, and the MEM-C 17 with each other. The ASIC 16 includes a PCI target, an AGP master, an arbiter (ARB) serving as a core part of the ASIC 16, a memory controller for controlling the MEM-C 17, a plurality of DMACs (direct memory access controllers) for performing rotation of image data and the like using hardware logic and the like, and a PCI unit for transferring data to and from the engine 60 via the PCI bus. The ASIC 16 is connected to the FCU 30, the USB 40, and the IEEE1394 interface 50 via the PCI bus.

The MEM-C 17 is a local memory used as an image buffer for copying and a code buffer. The HDD 120 serves as a storage device for storing image data, program, font data, and form.

The AGP bus 15 is a bus interface for a graphic accelerator card provided for speeding up graphics processing and may speed up the graphics accelerator card by high throughput direct access to the MEM-P 12.

It is to be noted that an image forming program executed by the image forming apparatus 100 is incorporated in advance in the ROM 12A and the like.

Alternatively, the image forming program executed by the image forming apparatus 100 may be stored in an installable or executable file stored on a computer readable storage medium such as a CD-ROM (compact disc read-only memory), a FD (flexible disc), a CD-R (compact disc-recordable), a DVD (digital versatile disk), and the like.

Alternatively, the image forming program executed by the image forming apparatus 100 may be stored on a computer connected to a network such as the Internet and the like, and may be downloaded via the network, or may be provided or distributed via a network such as the Internet and the like.

The image forming program executed by the image forming apparatus 100 has a module configuration including a display-input controller, a print controller, a scanner controller, an ID manager, a detector, an ID receiver, and the like, described later. Actually, when the CPU 11 (e.g., a processor) reads the image forming program from the ROM 12A to execute the program, the above members may be loaded and generated in a main storage device.

A description is now given of a document storage function of the image forming apparatus 100 according to this exemplary embodiment.

The image forming apparatus 100 has a function (e.g., a document storage function) of storing image data in a storage device and printing the stored image data by operation of the control panel 200 and the like.

When a user gives an instruction to store image data using the document storage function with the control panel 200 and the like, serving as an operation device, the image forming apparatus 100 stores the image data input by an image input device (e.g., a scanner) in a storage device (e.g., the HDD 120). The image forming apparatus 100 also stores a first identifier (e.g., a document name and a document ID) associated with the image data to call the image data.

The first identifier is displayed on the control panel 200 of the image forming apparatus 100 or an operation device of a PC (personal computer) and the like, connected via the network. When the user selects the first identifier of the image data on the control panel 200, the image forming apparatus 100 may print the image data associated with the first identifier.

Figure 2:
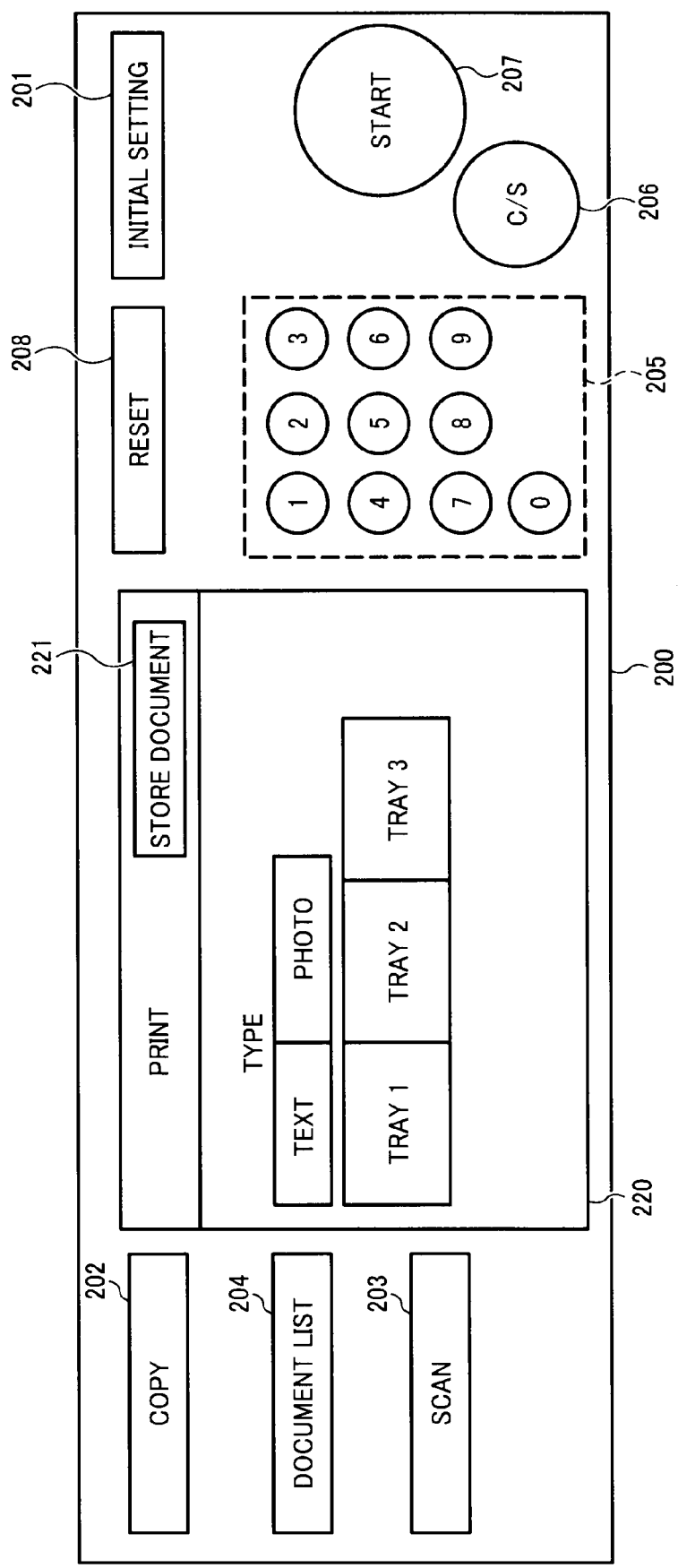
FIG. 2 is a schematic view of a control panel included in the image forming apparatus shown in FIG. 1.
Figure 3:
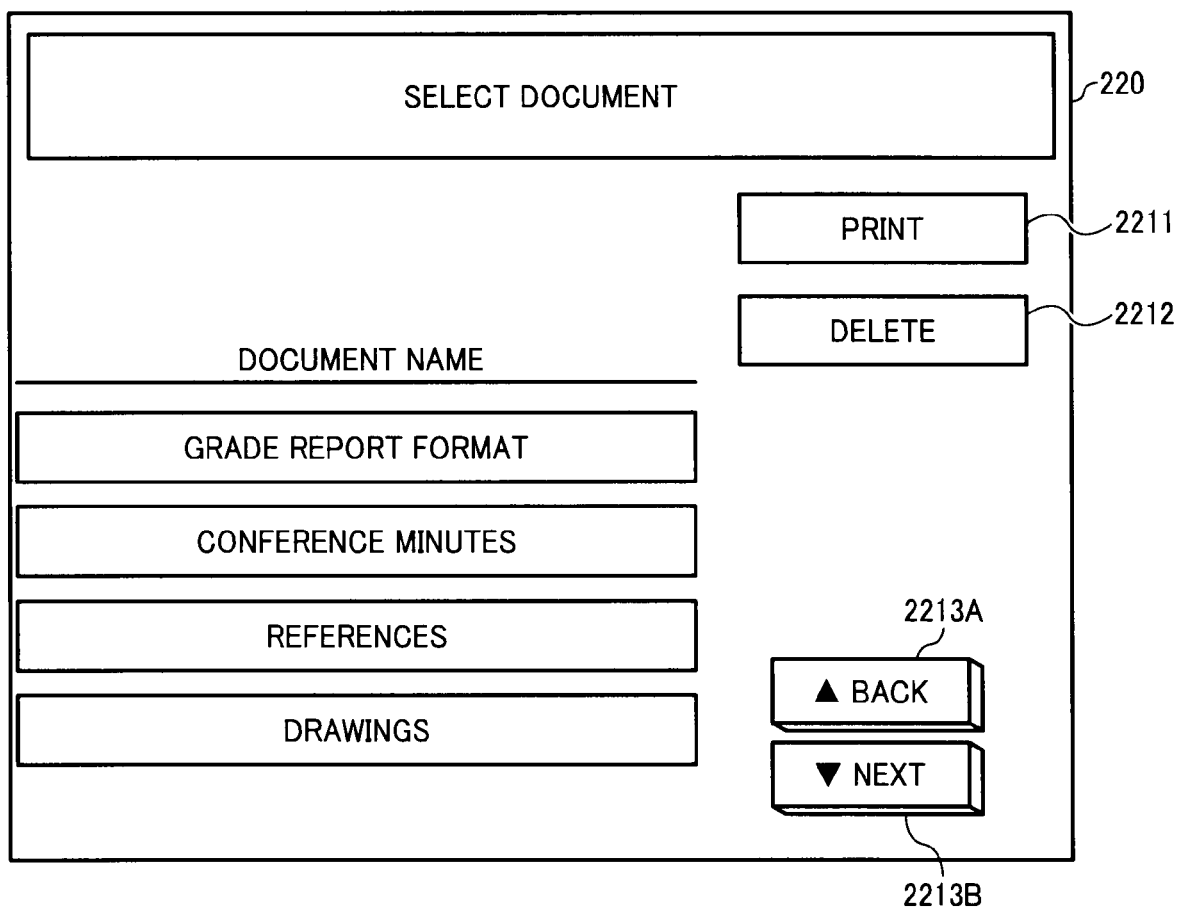
FIG. 3 is a schematic view of a liquid crystal display (LCD) touch panel included in the control panel shown in FIG. 2.

Referring to FIGS. 2 and 3, a description is now given of operation of the document storage function. FIG. 2 is a schematic view of the control panel 200 of the image forming apparatus 100. The control panel 200 includes an INITIAL SETTING key 201, a COPY key 202, a SCAN key 203, a DOCUMENT LIST key 204, a numeric keypad 205, a CLEAR/STOP key 206, a START key 207, a RESET key 208, and a liquid crystal display (LCD) touch panel 220. The LCD touch panel 220 includes a STORE DOCUMENT key 221.

The numeric keypad 205 is used to enter a number of copies. The CLEAR/STOP key 206 is used to interrupt a copy job. The START key 207 is used to start a copy job. The INITIAL SETTING key 201 is used to display a screen for setting an initial state of the image forming apparatus 100.

When the user presses the INITIAL SETTING key 201, a menu for initial setting is displayed on the crystal liquid touch panel 220. The user may choose a sheet size and the like using the initial setting menu. When the user presses the COPY key 202, the LCD touch panel 220 displays a Copy menu with a choice of two types of original documents, three types of trays, and the like, while displaying the STORE DOCUMENT key 221, as illustrated in FIG. 2.

In order to store image data in the image forming apparatus 100, the user may press the STORE DOCUMENT key 221. After pressing the STORE DOCUMENT key 221, when the user presses the START key 207, the image data may be read and stored as a document in the image forming apparatus 100. When the image data is stored as a document, the user may choose whether or not to print the document.

The user may choose not to print the document when the user presses the SCAN key 203 to store the image data in the image forming apparatus 100 in a scanner mode, and may choose to print the document when the user presses the COPY key 202 to store the image data in a copy mode.

According to this exemplary embodiment, a document denotes one piece or a plurality of pieces of image data obtained by the scanner engine 150 (depicted in FIG. 1) of the image forming apparatus 100 reading an original document including one or a plurality of sheets, printer data sent from a PC via the network I/F 160 (depicted in FIG. 1), or facsimile data received from the FCU 30 (depicted in FIG. 1).

When the user presses the DOCUMENT LIST key 204, the control panel 200 displays a list of documents (e.g., stored documents) stored in the image forming apparatus 100. The list includes a document ID and a document name associated with the stored image data.

FIG. 3 illustrates an example of a screen for choosing the stored documents displayed on the LCD touch panel 220. The LCD touch panel 220 further includes a PRINT key 2211, a DELETE key 2212, a BACK key 2213A, and a NEXT key 2213B.

In order to select a document other than those displayed thereon, the user may press the BACK key 2213A or the NEXT key 2213B to display another documents on the LCD touch panel 220.

When the user selects one document and presses the PRINT key 2211, the image forming apparatus 100 prints the document. The image forming apparatus 100 prints the document under a desired printing condition or conditions selected by the user from among various types of printing conditions (e.g., color or monochrome, duplex, and combination). The user also may select one piece of image data included in the stored document and print only the selected image data. The user may perform such operation before or after choosing the document.

Alternatively, when the user selects a document and presses the DELETE key 2212, the image forming apparatus 100 may delete the selected document.

A description is now given of a marking printing function of the image forming apparatus 100 according to the exemplary embodiment.

The image forming apparatus 100 has a function (e.g., a marking printing function) to read a mark printed on an original document using the scanner engine 150 (depicted in FIG. 1) to control subsequent printing processing and the like based on information embedded in the mark.

In printing image data on a print sheet, the image forming apparatus 100 generates a second identifier for identifying the printed sheet and prints a mark image (e.g., a mark) encoded from the second identifier on each print sheet, which is referred to as "marking printing".

The printed image data and the second identifier are associated with each other and stored in a storage device (e.g., the HDD 120 depicted in FIG. 1) or the like.

When the user commands the scanner engine 150 to read the mark printed on the print sheet, the image forming apparatus 100 reprints all images included in a job of printing the image data associated with the second identifier, which is referred to as "reprinting by marking".

Figure 4:
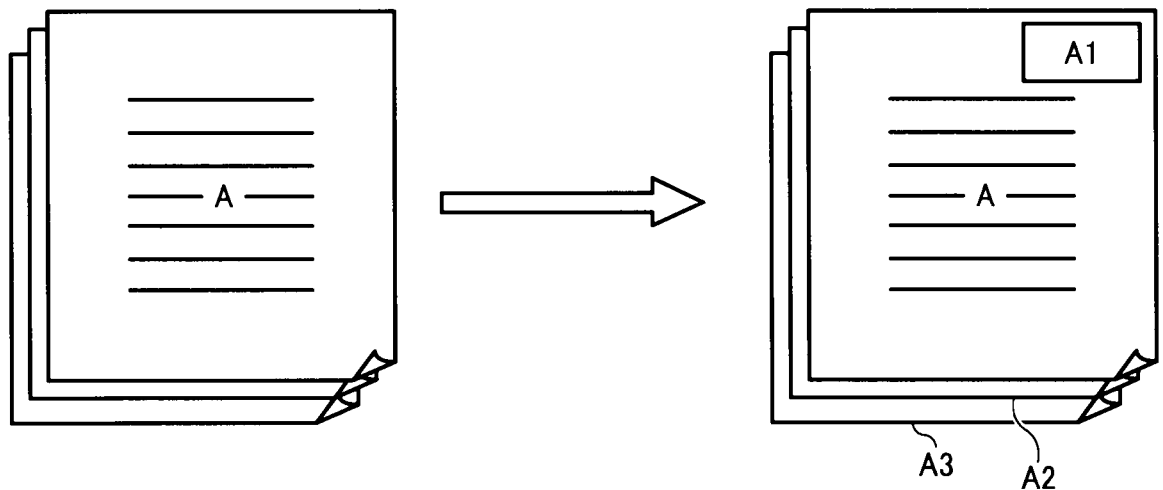
FIG. 4 is a schematic view of one example of marking printing using a marking printing function of the image forming apparatus shown in FIG. 1.
Figure 5:
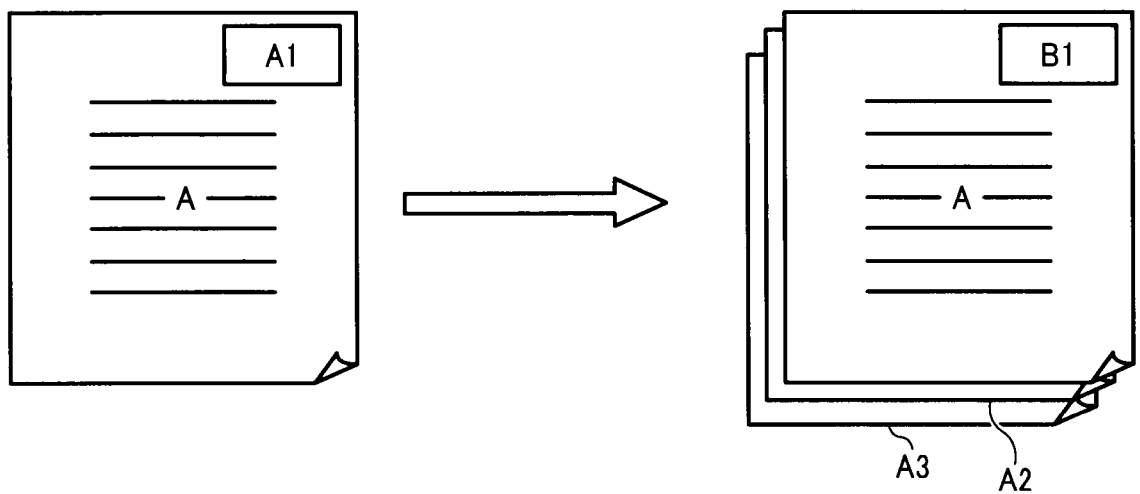
FIG. 5 is a schematic view of one example of marking reprinting using the marking printing function.

Referring to FIGS. 4 and 5, a description is now given of an operation of the marking printing function of the image forming apparatus 100. FIG. 4 is a schematic view of one example of the marking printing function according to this exemplary embodiment.

When a document A including a plurality of sheets is copied or printed, each printed sheet is printed with a mark encoded from identification data (e.g., PID) for uniquely identifying the printed sheet. For example, a PID number of A1 is marked on a first sheet, and then PID numbers of A2 and A3 are marked on a second sheet and a third sheet, respectively. The PID number is one example of the second identifier.

The mark generation processing employed here may use any conventional code generation method, including a QR code (registered trademark) and a two-dimensional bar code.

FIG. 5 is a schematic view illustrating a marking reprinting process of the image forming apparatus 100 according to the exemplary embodiment. For example, when the image forming apparatus 100 scans the sheet marked with the PID number A1, which is printed using the marking printing function as illustrated in FIG. 4, to reprint the sheet, the image forming apparatus 100 reprints not only the sheet marked with the PID number A1 but also another sheet or sheets simultaneously printed in a print job.

That is, the image forming apparatus 100 reprints not only the scanned sheet marked with the PID number A1 but also another sheet or sheets including the sheets marked with the PID numbers A2 and A3 (depicted in FIG. 4), respectively. For example, as illustrated in FIG. 5, the reprinted sheets are printed with new PID numbers of B1, B2, and B3, respectively.

A description is now given of a relation between the document storage function and the marking printing function of the image forming apparatus 100 according to the exemplary embodiment.

The image forming apparatus 100 may store the image data stored using the document storage function or printed using the marking printing function in an image memory (not shown), and may reprint the image data stored in the image memory. Compared to printing a sheet according to an original document on which an image is formed, that is, making a copy of the original document, the image forming apparatus 100 may prevent image deterioration by printing stored image data instead.

According to this exemplary embodiment, the image forming apparatus 100 determines whether or not to perform document storage based on a setting input by the user when the image forming apparatus 100 reads the original document. Specifically, when the user uses the document storage function, the user may choose either "Store only" or "Store and print". Alternatively, when the user does not use the document storage function, the image forming apparatus 100 determines that the user chooses to "Print only".

By contrast, the user may not choose whether or not to perform the marking printing function, because an administrator sets whether or not the marking printing function of the image forming apparatus 100 is effective, so that the image forming apparatus 100 may perform all print processes according to the setting. Since the mark printed on the sheet may identify by whom, when, and where the print sheet is printed, the marking printing function can provide a security feature for preventing the print sheet from being lost. Due to such security feature, the marking printing function is controlled by the administrator and not by the user.

According to this exemplary embodiment, the marking printing function of the image forming apparatus 100 is in effect. Thus, the image forming apparatus 100 performs marking printing every time the image forming apparatus 100 prints a document, for example, when the image forming apparatus 100 prints a sheet by reading an original document and when the image forming apparatus 100 prints a stored document using the document storage function.

In addition, in the document storage function, after a predetermined time period elapses, the stored document is no longer displayed on the control panel 200 (depicted in FIG. 2) because the user chooses a document to be printed on the control panel 200. That is, when many documents are stored in the image forming apparatus 100, the user may take a lot of time to find a desired document from the stored documents if too many documents are displayed at once. Therefore, the control panel 200 does not display the stored documents after a predetermined time period elapses even though the storage device (e.g., the HDD 120 depicted in FIG. 1) has enough capacity.

According to this exemplary embodiment, when a predetermined time period elapses after image data is stored as a document in the image forming apparatus 100, or when a predetermined time period elapses after previous use of the document, the control panel 200 does not display the document.

In case of using the document storage function only, when the control panel 200 does not display the stored document, the document is deleted.

However, in using the marking printing function, since the user does not need to choose image data, the image data does not need to be deleted as long as the storage device has enough capacity. Thus, when the storage device lacks capacity, the image data may be deleted. This is one example of a second condition.

Accordingly, the document storage function differs from the marking printing function. However, in using the document storage function, when the user chooses to "Store and print" a document, the image forming apparatus 100 may simultaneously perform both functions for the same job. However, even though image data to be stored is identical to image data to be printed, a storage device (e.g., the HDD 120) needs twice the storage capacity for separately storing the identical image data in using both functions.

To address this problem, the document storage function and the marking printing function may share the image data while separately managing the image data. Specifically, the document storage function, serving as a first document manager, associates the image data with the first identifier, while the marking printing function, serving as a second document manager, associates the image data with the second identifier.

However, in this case, since both functions have different conditions for deleting the image data, respectively, the image data is not deleted when one condition for one of the document storage function and the marking printing function is satisfied.

Thus, when the user chooses to "Store and print" image data using the document storage function, the image data is not deleted even when a predetermined time period elapses. Since the control panel 200 displays stored documents even when a predetermined time period elapses, the control panel 200 may display many documents, causing the user to take a lot of time to find a desired document.

In addition, the document storage function starts storing and managing image data when the image forming apparatus 100 reads the image data, while the marking printing function starts storing and managing image data when the image forming apparatus 100 prints the image data. Thus, the image forming apparatus 100 having the document storage function and the marking printing function needs to perform complicated processes.

Figure 6:
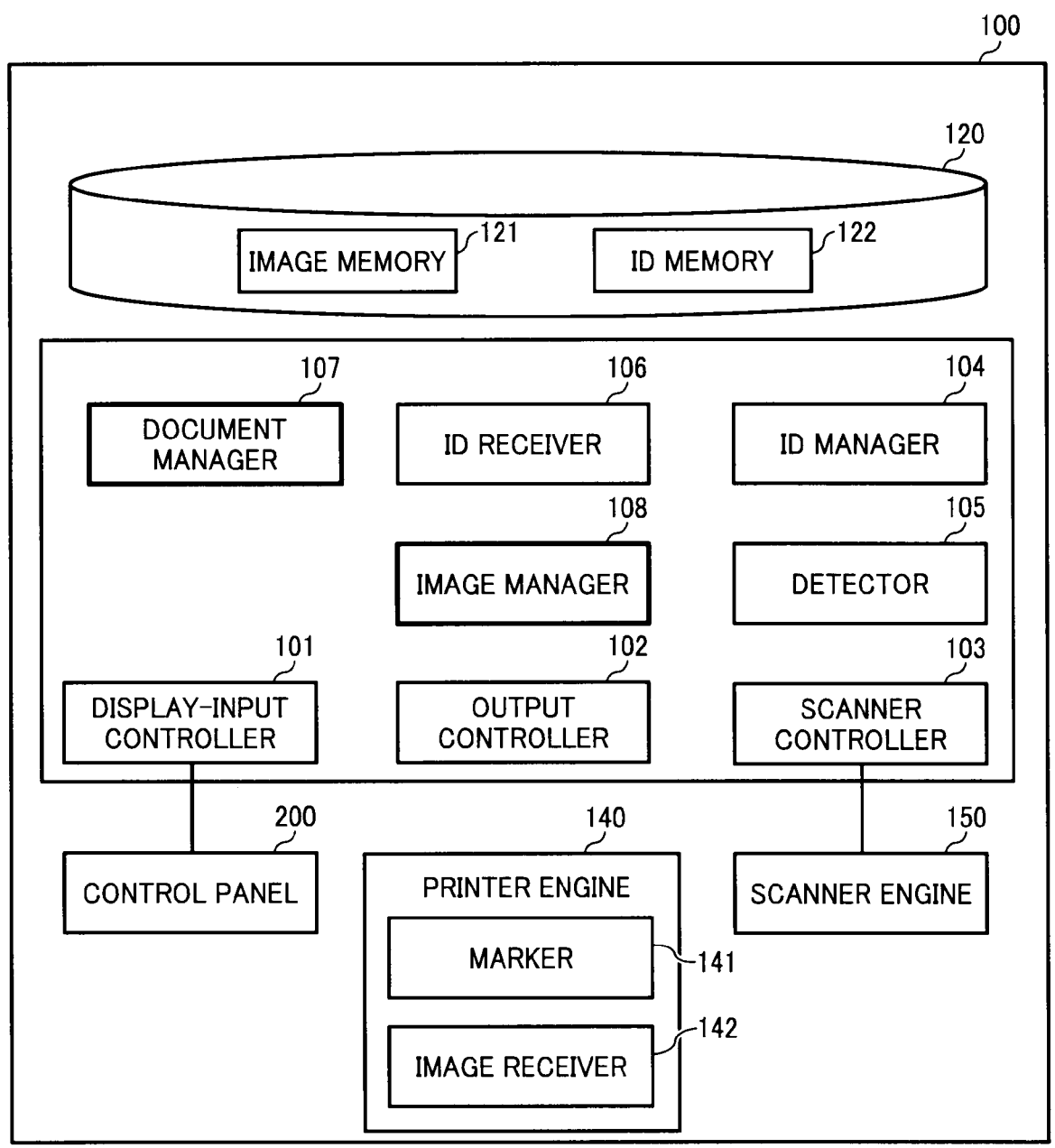
FIG. 6 is a schematic diagram of a software configuration of the image forming apparatus shown in FIG. 1.

Referring to FIG. 6, a description is now given of a software configuration of the image forming apparatus 100 for addressing the above-described problem. FIG. 6 is a diagram of the software configuration of the image forming apparatus 100 according to this exemplary embodiment.

The image forming apparatus 100 further includes a display-input controller 101, an output controller 102, a scanner controller 103, an ID manager 104, a detector 105, an ID receiver 106, a document manager 107, and an image manager 108. The HDD 120 includes an image memory 121 and an ID memory 122. The printer engine 140 includes a marker 141 and an image receiver 142.

The image memory 121 is one example of an image storage device and stores image data read by the scanner engine 150. The image memory 121 may also receive and store image data entered by an external image forming apparatus and the like other than the image forming apparatus 100 via the network I/F 160 (depicted in FIG. 1).

The ID memory 122 stores ID (e.g., EID) for uniquely identifying the image data stored in the image memory 121 and ID information associated with various types of identification information necessary for performing the document storage function and the marking printing function.

In order to perform the above document storage function, the document manager 107 and the image manager 108 together control the image data stored in the image memory 121 and the identification information stored in the ID memory 122. Both the document manager 107 and the image manager 108, which constitute the document storage function, are one example of a first document manager.

In order to perform the marking printing function, the ID manager 104, the detector 105, the ID receiver 106, and the image manager 108 control the image data stored in the image memory 121 and the identification information stored in the ID memory 122. The ID manager 104, the detector 105, the ID receiver 106, and the image manager 108, which constitute the marking printing function, are one example of a second document manager.

Although in the present embodiment the image memory 121 and the ID memory 122 are included in the HDD 120, alternatively they may be included in any generally used recording medium including an optical disc, a memory card, and a RAM (random access memory). However, in order to be able to read image data even after the image forming apparatus 100 is powered off, a nonvolatile recording medium (e.g., the HDD 120) is preferable.

FIG. 7A is a data table (e.g., an image management table) of the EID stored in the ID memory 122 (depicted in FIG. 6) associated with a storage location of the image data. The data table includes three columns, consisting of EID, file name, and status. As illustrated in FIG. 7A, ten file names of ten pieces of the image data are associated with each EID number. The image manager 108 (depicted in FIG. 6) for managing the image management table may store image data, obtain image data from an EID number, and change a status of the image data.

It is to be noted that the column "status" of the image management table is described later in detail. In order to change the status of the image data, the output controller 102 (depicted in FIG. 6) determines the status of the image data, and the image manager 108 changes a value representing the status of the image data. A method of changing the status of the image data is described later.

FIG. 7B is one example of a data table (e.g., a document management table) of ID information necessary for performing the document storage function. The data table is stored in the ID memory 122 (depicted in FIG. 6) and includes five columns, consisting of FID, document name, EID, selectability, and time remaining. The ID information is one example of the first identifier. The FID, the document name, and the EID are associated with each other. A FID indicates an ID number applied to each stored document and common to one piece or a plurality of pieces of image data included in each stored document. A document name indicates a name applied by the user to each stored document. When the document name is displayed on the control panel 200, the user can identify the document. The data table shown in FIG. 7B stores four documents.

The column "selectability" indicates information as to whether or not to display a document name on the control panel 200 (depicted in FIG. 2) in the document storage function. Specifically, the column "selectability" contains a flag value of 1 or 0. For example, when the flag value is 1, the image forming apparatus 100 allows the document name of the document to be displayed on the control panel 200, so that the user may choose the document name on the control panel 200 and print the document corresponding to the document name using the document storage function. When the flag value is 0, the image forming apparatus 100 prohibits the document name from being displayed on the control panel 200. Since the document name is not displayed on the control panel 200, the user does not choose the document name on the control panel 200 and does not print the corresponding document using the document storage function of the image forming apparatus 100.

For example, as illustrated in FIG. 7B, the flag value of the selectability of "references" of the FID number 3 is 0. Thus, the image forming apparatus 100 prohibits a document name "references" from being displayed on the control panel 200. Alternatively, direct input of a document name with a flag value of 0 may prohibit the image forming apparatus 100 from printing the document. In this case, the user may enter the document name not only on the control panel 200 but also on a PC connected via the network.

The column "time remaining" indicates time remaining until the control panel 200 does not display the stored document in the document storage function (e.g., an auto-deletion time). When the auto-deletion time is 0, the document manager 107 (depicted in FIG. 6) sets the flag value of selectability of the document to 0, so that the control panel 200 does not display the document name.

When the document has not been printed before, image data of the document is not controlled using the marking printing function. Therefore, the image forming apparatus 100 determines that the document is used in the document storage function only and not used in the marking printing function. Accordingly, the document manager 107 deletes the image data when the auto-deletion time is 0 and deletes information of the document and the image data from the document management table and the image management table, respectively.

Alternatively, the auto-deletion time indicates an elapsed time since the document is stored in the image forming apparatus 100. Thus, the document manager 107 deletes the document when the auto-deletion time exceeds a predetermined value. Or, the auto-deletion time may refer to an elapsed time since the document was previously used. The above conditions are one example of a first condition.

The document manager 107 manages image data stored in the image forming apparatus 100 for each document in the document storage function and also commands to print the document or the image data.

Specifically, the document manager 107 assigns a common FID number to each piece of image data and an EID number to each piece of the image data. The EID number is unique to each piece of image data. The document management table stores the FID number associated with the EID number.

FIG. 8 is a data table (e.g., an ID management table) of ID information for performing the marking printing function according to this exemplary embodiment. The data table is stored in the ID memory 122 (depicted in FIG. 6).

The ID management table includes columns consisting of PID, EID, parent ID, BID, JID, and print setting, all of which are associated with each other.

The JID number indicates an ID uniquely assigned to a job of printing a series of images of an original document.

BID indicates an ID uniquely assigned to each set of copies in copying a plurality of sets. Since the user may specify to print a plurality of sets of copies in one job, a plurality of numbers of BID may correspond to one JID.

The PID and the EID are described above.

A parent PID indicates a PID number of an original print sheet which is reprinted and may be applied in reprinting processing. For example, as illustrated in FIG. 8, since print sheets with the PID numbers of 1 to 4 belong to a common job having a JID number of 1, when all the print sheets with the PID numbers of 1 to 4 are reprinted by only scanning the print sheet with the PID number 1, parent PID numbers of 1 to 4 are applied to reprinted sheets marked with new PID numbers of 5 to 8 corresponding to the PID numbers of 1 to 4, respectively.

Since the ID memory 122 stores the above information, when a PID number of an arbitrary sheet is specified, the image forming apparatus 100 can reprint all corresponding images.

Referring back to FIG. 6, based on an instruction entered on the control panel 200, the display-input controller 101 determines processing and commands to perform the processing. The display-input controller 101 also determines whether or not to perform the processing based on a condition of the image forming apparatus 100. For example, when the user presses the START key 207 (depicted in FIG. 2) on the control panel 200 immediately after the image forming apparatus 100 is powered on, the display-input controller 101 may not command to perform the corresponding processing.

The display-input controller 101 also controls displaying various types of screens on the LCD touch panel 220 (depicted in FIG. 2). For example, the display-input controller 101 controls displaying the document list of the documents stored in the image forming apparatus 100.

The scanner controller 103 optically reads an image on an original document placed on a reader (e.g., an ADF (auto document feeder) and an exposure glass) included in the image forming apparatus 100 and converts the read image into an electrical signal. After the electrical signal is converted into a digital signal by an A/D (analog-digital) converter, when the digital signal is subjected to image processing (e.g., shading correction, MTF (modulation transfer function) correction, and γ correction), the scanner controller 103 receives the digital signal as image data via a variable power circuit for enlarging and reducing a size of the image data.

As well as for the document storage function, the control panel 200 is used for the marking printing function. For example, the control panel 200 is used for issuing a command to scan an image, print the image, and reprint the image, and also used for setting a print condition. As illustrated in FIG. 8, when marking printing is performed, the print setting used for marking printing is stored in the ID management table. When the user does not enter any command for changing the stored print setting, printing is performed under the stored print setting, that is, a print condition under which the previous marking printing is performed.

The printer engine 140 forms image data on a recording sheet and the like using an inkjet method, an electrophotographic method, or the like.

The marker 141 generates a mark from an encoded PID specified by the output controller 102. The printer engine 140 combines an image having the mark (e.g., encoded image) with original image data and prints the combined image.

The image receiver 142 acquires from the image memory 121 an image corresponding to an EID number acquired by the ID receiver 106. The printer engine 140 prints the image acquired by the image receiver 142.

Alternatively, the marker 141 and the image receiver 142 can be provided outside the printer engine 140, so that the printer engine 140 prints an image, in which the image data acquired by the image receiver 142 is combined with the coded image generated by the marker 141, sent from the image receiver 142 and the marker 141.

The scanner engine 150 drives a scanner, not shown, to scan the original document and also reads a mark printed on a sheet in the marking printing function.

The output controller 102 controls the printer engine 140. According to this exemplary embodiment, the output controller 102 controls image output, for example, storing an image in the image memory 121, so as to print the stored image after an image scanned by the scanner engine 150 is temporarily stored in the image memory 121.

The scanner controller 103 controls the scanner engine 150.

The ID manager 104 performs management of each ID stored by the ID memory 122 in the marking printing function. For example, the ID manager 104 generates an ID number such as JID and BID for each image input and print output and stores the ID number in the ID memory 122. The ID manager 104 generates an EID number for each image input for printing and stores the EID number associated with a JID number in the ID memory 122.

In response to an inquiry, the ID manager 104 acquires each ID number from the ID memory 122 and responds to the inquiry. For example, when the ID manager 104 receives an inquiry about a JID number corresponding to a PID number detected by the detector 105, the ID manager 104 acquires the JID number corresponding to the PID number and responds to the inquiry.

The detector 105 detects a mark from an original image read by the scanner engine 150 and detects a PID number marked with the original image by decoding the detected mark.

The ID receiver 106 acquires EID numbers of all images included in one print operation (e.g., one print job or one copy set of the print sheets) with PID numbers detected by the detector 105 to specify an image to be reprinted. The ID receiver 106 also receives a print setting, that is, a print condition corresponding to the print operation with the detected PID numbers.

For example, the ID receiver 106 inquires the ID manager 104 for a JID number or a BID number corresponding to the detected PID number. After receiving the JID number or the BID number, the ID receiver 106 inquires the ID manager 104 for every EID number corresponding to the JID number or the BID number to receive the EID number. The ID receiver 106 inquires the ID manager 104 for a print setting corresponding to the acquired JID number or BID number and receives the print setting.

Figure 9:
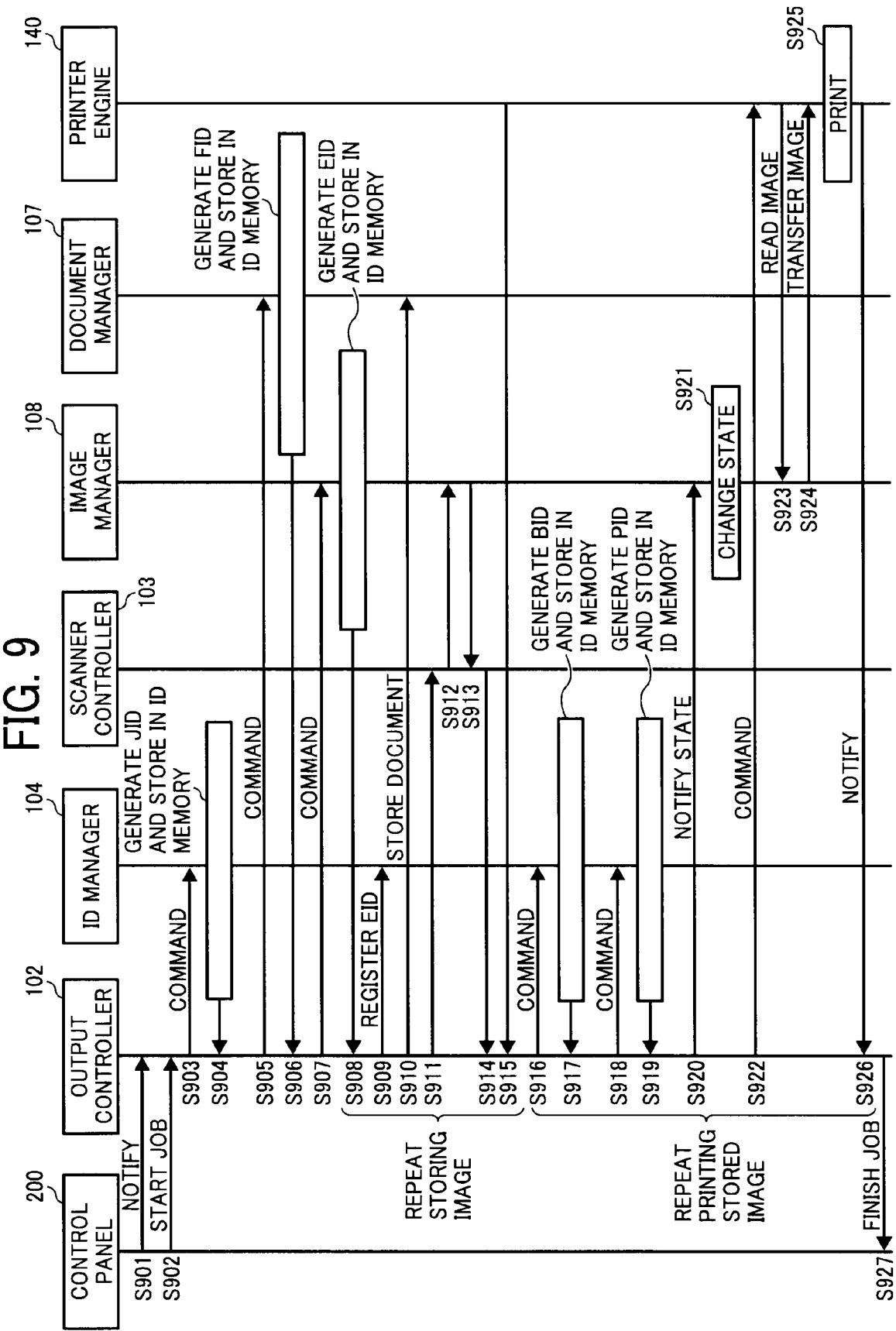
FIG. 9 is a flowchart illustrating a process of storing and printing a document using a document storage function of the image forming apparatus shown in FIG. 6.
Figure 10:
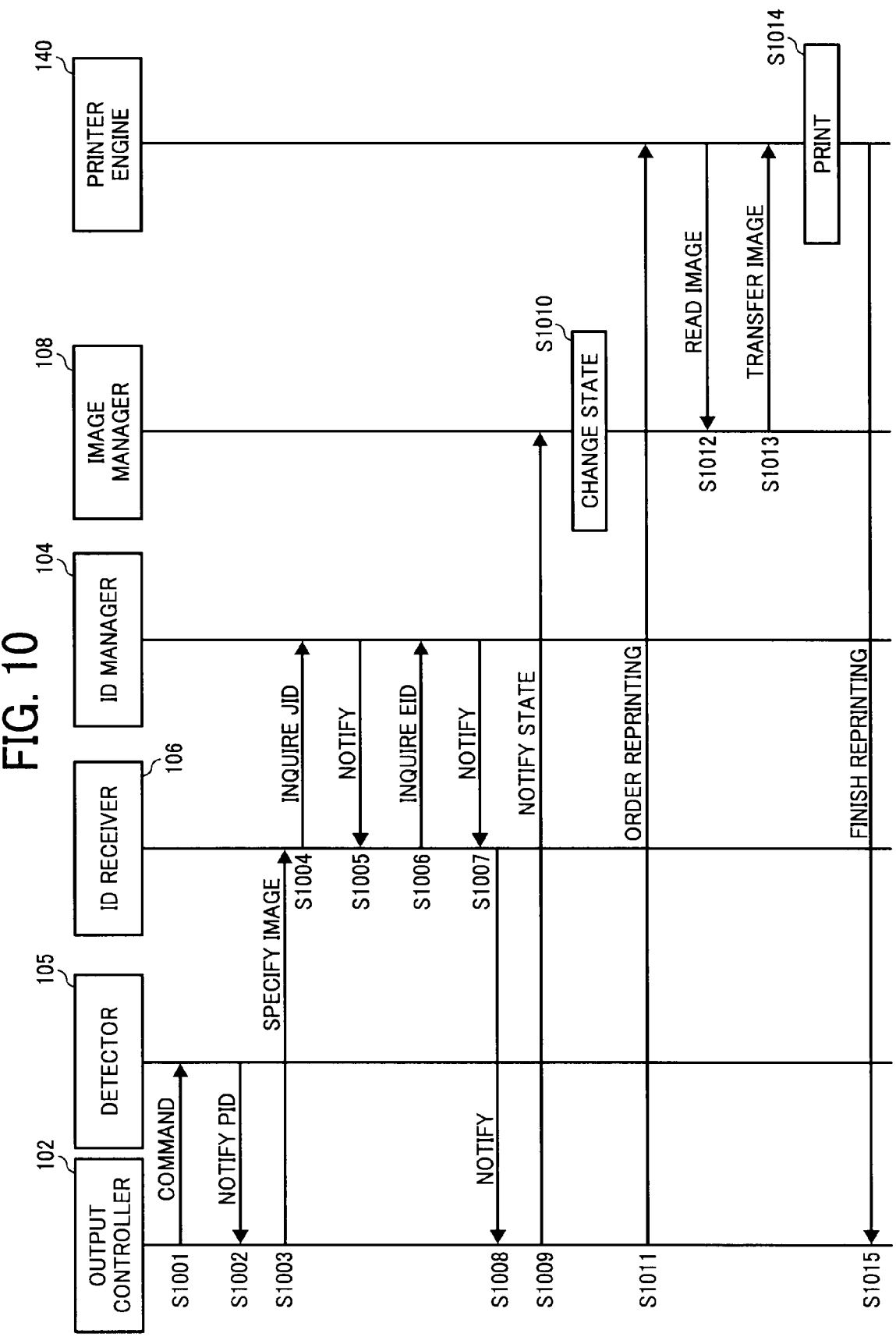
FIG. 10 is a flowchart illustrating a process of reprinting a document using a marking printing function of the image forming apparatus shown in FIG. 6.

Referring to FIGS. 9 and 10, a description is now given of print processing performed by the image forming apparatus 100 according to this exemplary embodiment. FIG. 9 is a flowchart illustrating a process of storing and printing a document using the document storage function.

In step S901, when the user presses the STORE DOCUMENT key 221 (depicted in FIG. 2) displayed on the control panel 200 (depicted in FIG. 2), the display-input controller 101 (depicted in FIG. 6) detects that the STORE DOCUMENT key 221 is pressed, notifies the output controller 102 of using the document storage function, and highlights the STORE DOCUMENT key 221. It is to be noted that FIG. 9 omits the display-input controller 101. Alternatively, the STORE DOCUMENT key 221 may have a different shape, for example, instead of being highlighted, so as to inform the user of selection of document storage processing.

In step S902, when the user presses the START key 207 (depicted in FIG. 2) on the control panel 200 to command the image forming apparatus 100 to start a job, the output controller 102 issues a command to generate a JID number to the ID manager 104 in step S903. In step 904, the ID manager 104 generates a JID number and stores the JID number in the ID memory 122.

Subsequently, when the output controller 102 issues a command to generate a FID number to the document manager 107 in step S905, the document manager 107 generates a FID number and stores the FID number in the ID memory 122 in step S906.

In steps S907 to S915, the output controller 102 repeatedly reads each original image with the scanner and stores the read image as image data in the image memory 121. In order to perform marking printing on a document stored in the image forming apparatus 100 using the document storage function, since the image memory 121 stores image data of the document, the image data does not need to be stored again.

Specifically, in step S907, when the output controller 102 issues a command to generate an EID number to the image manager 108, the output controller 102 determines a status of the image data according to a type of a job and transmits the status to the image manager 108. In step S908, when the image manager 108 generates an EID number and stores the EID number together with the status of the image data in the image management table (depicted in FIG. 7A) of the ID memory 122 (depicted in FIG. 6), the image memory 121 prepares to store image data for one page.

In steps S909 and S910, the output controller 102 issues a command to register the EID number to the ID manager 104 (depicted in FIG. 6) and issues a command to start storing the document to the document manager 107 (depicted in FIG. 6). In step S911, the output controller 102 issues a command to start inputting image data to the scanner controller 103. Upon receipt of the command, the scanner controller 103 starts transferring the image data read from the scanner engine 150 to the image manager 108 in step S912. Then, the image manager 108 stores the image data in the image memory 121 (depicted in FIG. 6).

After completion of the image data transfer, in step S913, the image manager 108 notifies the scanner controller 103 of the completion of the image data transfer. In step S914, the scanner controller 103 notifies the output controller 102 that image input is completed.

Upon finishing reading all the images, in step S915, the output controller 102 notifies the document manager 107 of completion of storing the image data.

When all the image data are stored, in steps S916 to 926, the output controller 102 repeatedly prints each designated image data stored in the image memory 121 for designated number of sets.

To be specific, in step S916, the output controller 102 issues a command to generate a BID number according to the number of print sets to the ID manager 104. Then, the ID manager 104 generates a BID number and stores the BID number in the ID memory 122 in step S917.

In step S918, when the output controller 102 issues a command to generate a PID number to the ID manager 104, the ID manager 104 generates a PID number and stores the PID number in the ID memory 122 in step S919.

In steps S920 and S921, the output controller 102 determines a status of the image data and issues a command to change the status of the image data to the image manager 108 when needed. Since the status of the image data is identical to the status of the image data stored in step S908, the image manager 108 does not need to change the status of the image data. In order to perform marking printing on the document stored in the image forming apparatus 100 by using the document storage function, the image manager 108 may need to change the status of the image data in the above step S921. A method of changing the status of the image data is described later.

In step S922, the output controller 102 issues a command to print the image data to the printer engine 140 (depicted in FIG. 6), including information of the EID number of the image data and the PID number to be coded and combined with the image on a print sheet.

In step S923, when the image receiver 142 of the printer engine 140 starts reading the image data corresponding to the EID number from the image manager 121, in step S924, the image manager 121 reads the corresponding image data from the image memory 121 and transfers the image data to the printer engine 140.

In step S925, when the marker 141 (depicted in FIG. 6) generates a mark encoded from the PID number, the printer engine 140 combines the image data with the generated mark into a combined image and prints the combined image.

After printing the image, the printer engine 140 notifies the output controller 102 of completion of printing in step S926.

When the image print processing is completed, the output controller 102 commands the display-input controller 101 to display a message of completion of the job on the control panel 200 in step S927 and finishes print processing.

When the image forming apparatus 100 performs only marking printing, the image forming apparatus 100 may store image data while performing print processing, thereby achieving high-speed printing, compared to a case in which the image forming apparatus 100 reads the stored image data to print the image.

FIG. 10 is a flowchart illustrating a process of reprinting by marking performed by the image forming apparatus 100 according to the exemplary embodiment. Reprinting by marking is to reprint a sheet printed with a mark for each set or each job by scanning the sheet.

In step S1001, when the user issues a request to reprint a document via the control panel 200 and the like, the output controller 102 gives a command to start detecting a mark printed on the document to the detector 105. The image forming apparatus 100 may scan only one of print sheets for a print job to reprint all the print sheets which the user requests to reprint. In addition, the image forming apparatus 100 may scan only one of print sheets for each of a plurality of print jobs at a time, so as to perform the plurality of jobs simultaneously.

In step S1002, upon receipt of the command, the detector 105 detects all marks printed on the scanned print sheet and detects PID numbers by decoding the detected marks. Then, the detector 105 notifies the output controller 102 of the detected PID numbers.

In steps S1003 to S1008, the output controller 102 repeatedly specifies image data to be reprinted for each detected PID number. Specifically, in step S1003, the output controller 102 issues a command to start specifying the image data to the ID receiver 106. The above command includes the detected PID numbers.

In step S1004, when the ID receiver 106 inquires the ID manager 104 for a JID number corresponding to the PID number, the ID manager 104 acquires a JID number and a print setting corresponding to the PID number from the ID memory 122 and notifies the JID number and the print setting to the ID receiver 106 in step S1005.

In step S1006, the ID receiver 106 inquires the ID manager 104 for all EID numbers included in a job identified by the JID number.

In step S1007, the ID manager 104 acquires all the EID numbers corresponding to the JID number from the ID memory 122 and notifies a list of the acquired EID numbers to the ID receiver 106. In subsequent step S1008, the ID receiver 106 notifies the print setting acquired in step S1005 and the list of the EID numbers to the output controller 102.

In steps S1009 to S1014, the output controller 102 reprints image data corresponding to the acquired EID numbers. Like the print processing as illustrated in FIG. 9, the ID manager 104 generates a PID number of a reprinted sheet and a JID number of a reprint job, which are omitted in FIG. 10.

In addition, also in reprinting the document, the user may change a print setting including specification of a number of print sets and print conditions on the control panel 200 (depicted in FIG. 2). Thus, the ID manager 104 generates the JID number in the changed print setting. Therefore, when the print setting for a previous printing is different from the print setting for reprinting, the user may specify a desired number of print sets.

Specifically, in step S1009, when the output controller 102 notifies a status of the image data to the image manager 108 as needed, the image manager 108 changes the status of the image data in step S1010.

Subsequently, the output controller 102 issues a command to reprint the image data to the printer engine 140 in step S1011. The command includes the EID number of the image data and the PID number generated by the ID manager 104.

In step S1012, the image receiver 142 (depicted in FIG. 6) of the printer engine 140 starts reading the image data corresponding to the specified EID number from the image memory 121. When the image receiver 142 finishes reading the image data from the image memory 121 in step S1013, the marker 141 generates a mark encoded from the PID number and prints a print image combined with the mark in step S1014.

After completion of reprinting the image data, in step S1015, the printer engine 140 notifies the output controller 102 of completion of reprinting.

Figures 11, 12:
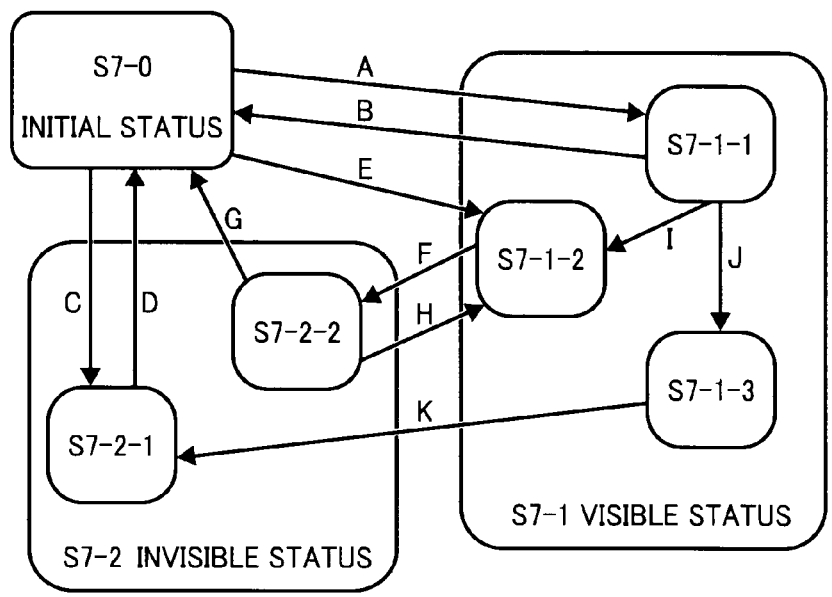
FIG. 11 is one example of the ID management table shown in FIG. 8.
FIG. 12 is a diagram illustrating a status transition of image data.

Referring to FIG. 11, a description is now given of a specific example of printing and reprinting a document according to the exemplary embodiment. FIG. 11 is one example of the ID management table illustrating a procedure of specifying an EID number of an image to be reprinted for each job.

For example, when a print job of printing two sets of a document including two pages is performed, the ID management table illustrated in FIG. 11 is stored in the ID memory 122 (depicted in FIG. 6). For example, the ID manager 104 generates a JID number of 1 with respect to the print job in step S904 (depicted in FIG. 9) and generates BID numbers of 1 and 2 corresponding to respective print sets, as illustrated in FIG. 11 in step S917 (depicted in FIG. 9).

The ID manager 104 supplies each image formed on each page with EID numbers 1 and 2 in step S908 (depicted in FIG. 9). The ID manager 104 also supplies PID numbers 1 to 4 to four sheets, respectively, in step S919 (depicted in FIG. 9).

When the user commands to reprint the document by scanning the sheet with the PID number of 1, surrounded by a circle 1101 depicted in FIG. 11, in step S1001 (depicted in FIG. 10), the ID manager 104 generates the JID number of 1, surrounded by a circle 1102 depicted in FIG. 11, corresponding to the PID number of 1 in step S1005 (depicted in FIG. 10) and generates the EID numbers of 1, 2, 1, and 2, surrounded by a circle 1103 depicted in FIG. 11, with respect to the job with the JID number of 1, respectively, in step S1007 (depicted in FIG. 10).

Accordingly, by merely scanning one sheet, the image forming apparatus 100 may acquire all images formed on all pages included in the print job.

Referring to FIGS. 12 to 16, a description is now given of a status transition of image data. FIG. 12 is a diagram illustrating the status transition of image data.

The column "status" of the image management table (depicted in FIG. 7A) represents information of a status of image data used for determination as to whether or not to prohibit operation of the document and delete the image data. The ID memory 122 (depicted in FIG. 6) stores the status of image data for each image data.

The output controller 102 (depicted in FIG. 6) determines which status the image data transfers to and notifies the determination to the image manager 108 (depicted in FIG. 6), so as to update the status of the image data stored in the image management table. The output controller 102 determines a status for transition based on a type of the job and a current status of the image data, when the job starts, when the auto-deletion time elapses, and when marking printing is performed, for example.

Status S7-0 is an initial status in which no image data exists. The image data may be deleted when the status of the image data transfers from another status to this Status S7-0.

Status S7-1 is a visible status in which the document is displayed on the control panel 200 (depicted in FIG. 2) and the user may print the document using the document storage function. In order to determine whether or not the document may be reprinted by marking printing, a further detailed status of the image data needs to be confirmed.

Status S7-2 is an invisible status. Although the user may reprint the document using the marking printing function, the image data is prohibited from being output using the document storage function because the document is not displayed on the control panel 200.

Figure 13:
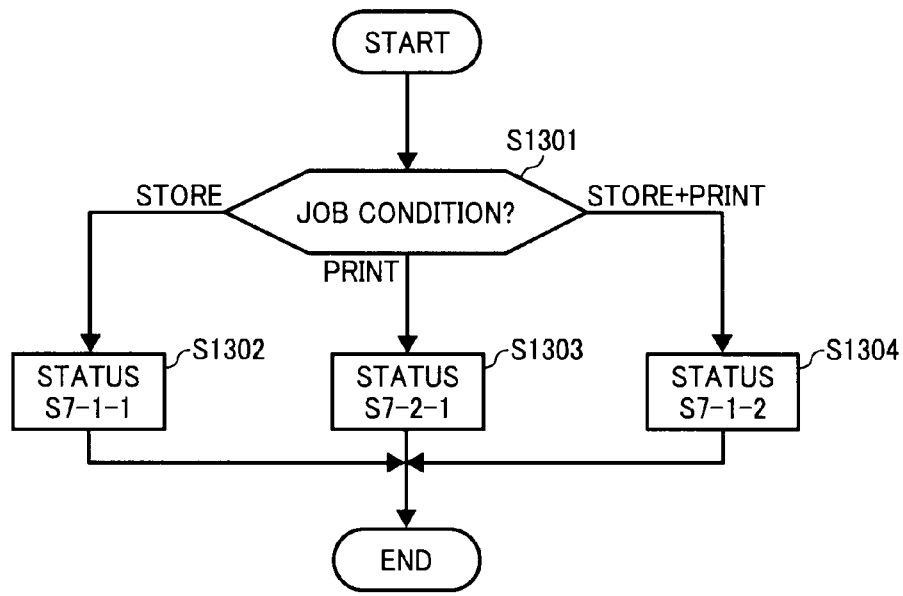
FIG. 13 is a flowchart illustrating a process of determination of a status of image data when the image data is read.

FIG. 13 is a flowchart illustrating a process of determination of a status of image data when the image data is read according to this exemplary embodiment. The output controller 102 (depicted in FIG. 6) determines the status of the image data based on a condition of a job and notifies the status of the image data in step S905 or S920 (depicted in FIG. 9).

In step S1301, the output controller 102 determines which job condition is selected among "Store only" for only storing a document, "Print only" for only printing a document, and "Store and print" for storing and printing a document by the user. When the user selects "Store only" using the document storage function, the image forming apparatus 100 only stores image data of the document. Thus, in step S1302 in FIG. 13, the status of the image data transfers from Status S7-0 to Status S7-1-1, included in Status S7-1, as indicated by arrow A depicted in FIG. 12. In this status, reprinting by marking is impossible because the document is only stored without marking printing.

When an auto-deletion time of the document becomes 0, the status of the image data transfers to Status S7-0, as indicated by arrow B in FIG. 12. Thus, the document manager 107 (depicted in FIG. 6) deletes the document from the document management table, so as to delete image data included in the document and delete corresponding data stored in the image management table. Since the image forming apparatus 100 does not need to store the image data for marking printing, the image forming apparatus 100 performs the document storage function only. As described above, the auto-deletion time of 0 is one example of the first condition.

When the user selects "Print only", the image forming apparatus 100 only performs marking printing, and the status of the image data transfers from Status S7-0 to Status S7-2-1 included in Status S7-2, as indicated by arrow C depicted in FIG. 12, in step S1303 depicted in FIG. 13. In this case, the control panel 200 does not display the document because the image forming apparatus 100 performs marking printing only. Therefore, the above status is not affected by the auto-deletion time.

When the user selects "Store and print" using the document storage function, the image forming apparatus 100 stores the image data and performs marking printing simultaneously, so that the status of the image data transfers from Status S7-0 to Status S7-1-2 included in Status S7-1, as indicated by arrow E in FIG. 12, in step S1304 depicted in FIG. 13. Therefore, the control panel 200 displays the document, so that the image forming apparatus 100 may perform reprinting by marking.

When the auto-deletion time of the document becomes 0, the control panel 200 does not display the document. However, since the image forming apparatus 100 needs to store the image data in order to reprint the document by marking, the image forming apparatus 100 does not delete the image data. Thus, the status of the image data transfers to Status S7-2-2, as indicated by arrow F depicted in FIG. 12, so that the document manager 107 changes the flag value stored in the document management table (depicted in FIG. 7B) to 0. Even when the first condition is satisfied, the image forming apparatus 100 may not delete the image data from an image storage device (e.g., the image memory 121 depicted in FIG. 6) and prohibit the first identifier from being specified on an operating device (e.g., the control panel 200 depicted in FIG. 6).

Figure 14:
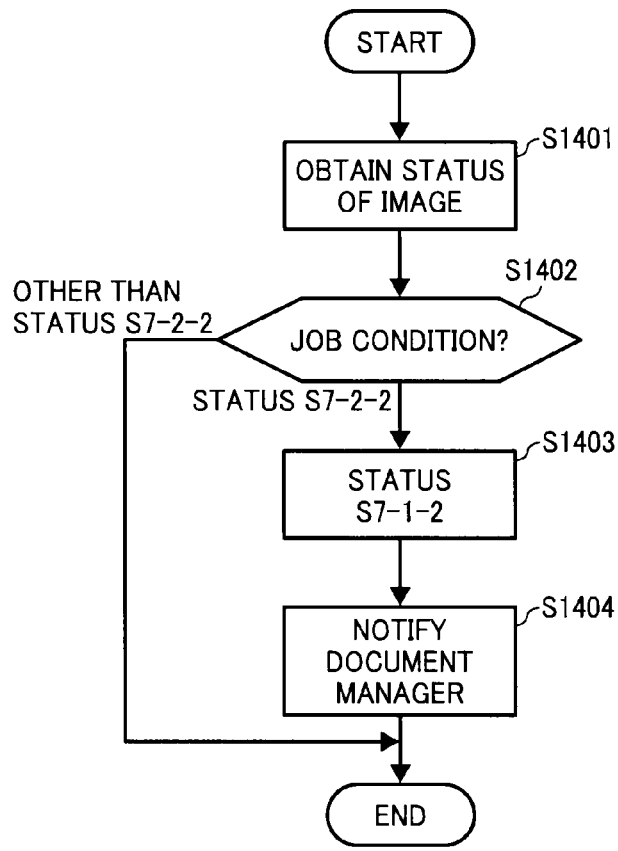
FIG. 14 is a flowchart illustrating a process of determination of a status of image data when the image data is reprinted by marking.

FIG. 14 is a flowchart illustrating a process of determination of a status of image data when the image data is reprinted by marking according to this exemplary embodiment. In steps S1401 and S1402, the output controller 102 (depicted in FIG. 6) determines the status of the image based on the status of the image data to be reprinted, and notifies the determination to the image manager 108 in step S1009 (depicted in FIG. 10).

When the image forming apparatus 100 performs reprinting by marking in Status S7-2-2, the output controller 102 determines that a job performed by "Store and print" is repeated. Thus, the status of the image data again transfers to Status S7-1-2 equivalent to the status in which the document is stored, so that the control panel 200 displays the document in step S1403 in FIG. 14, as indicated by arrow H (depicted in FIG. 12).

In step S1404, the ID manager 104 requests the document manager 107 to change the flag value of the document stored in the document management table to 1. In another status, the status does not change due to reprinting by marking.

Figure 15:
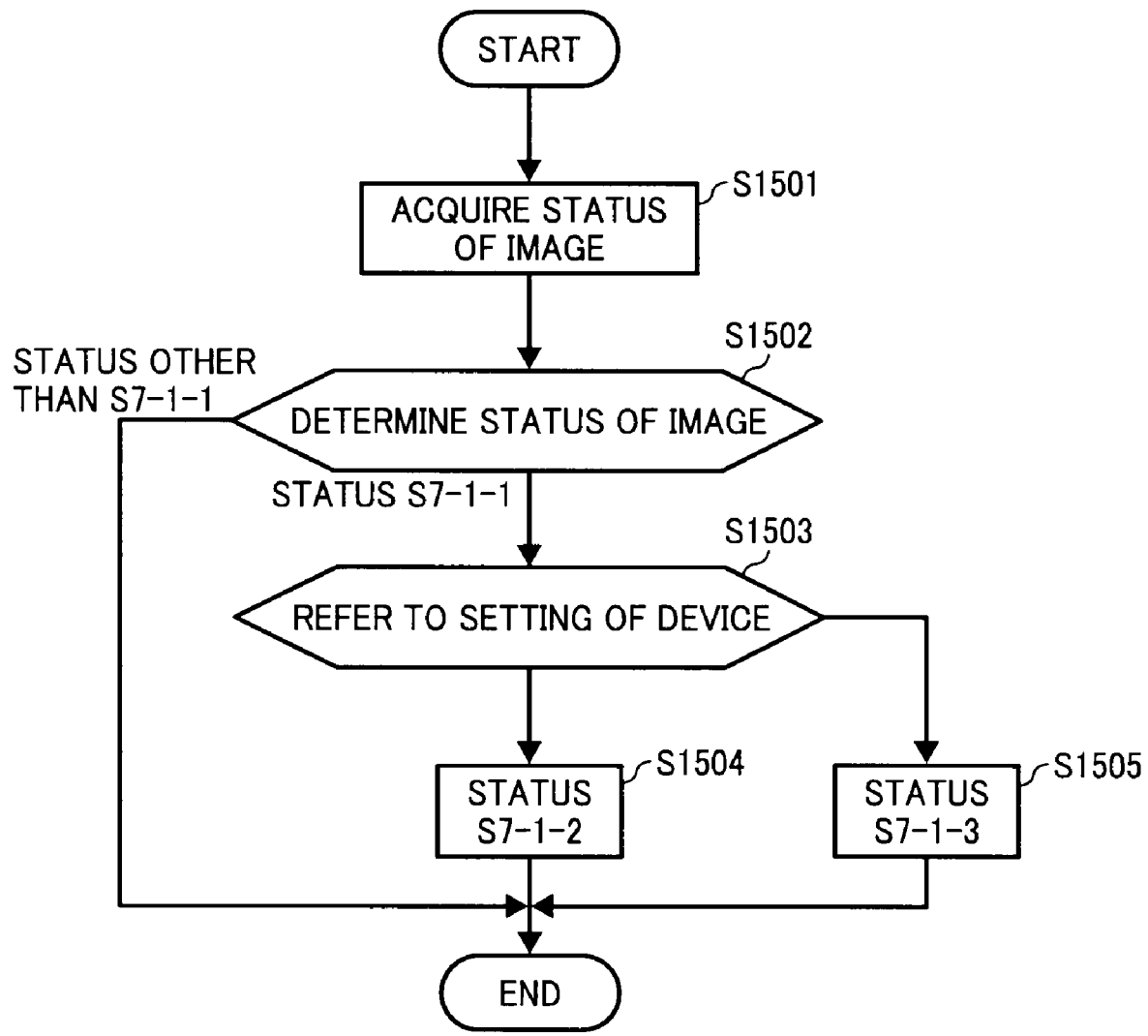
FIG. 15 is a flowchart illustrating a process of determination of a status of image data when the image data is printed by marking.

FIG. 15 is a flowchart illustrating a process of determination of the status of the image data in marking printing according to this exemplary embodiment.

In step S1501, the output controller 102 determines the status of the image data according to the status of the image data to be reprinted and notifies the determination to the image manager 108 in step S1009 depicted in FIG. 10. Specifically, when the output controller 102 determines that the image data is in the status other than Status S7-1-1 in step S1502, no status transition is performed.

When the user prints the image data using the document storage function after selecting "Store only" using the document storage function (e.g., when the status of the image data is Status S7-1-1), the mark printed on the printed sheet repeats a job performed by "Print only".

However, when a job performed by "Store and print" is not strictly distinguished from a job performed by "Print only" after being performed by "Store only", the job performed by "print only" after being performed by "Store only" may be considered to be equal to the job performed by "Store and print". Thus, the status of the image data transfers to Status S7-1-2, as indicated by arrow I in FIG. 12.

By contrast, when the above job is strictly distinguished from a job performed by reprinting by marking, it is not appropriate that the control panel 200 redisplays a document, which is no longer displayed on the control panel 200 after a job is performed on the document by "Print only". Therefore, the status of the image data transfers to Status S7-1-3, as indicated by arrow J depicted in FIG. 12.

In Status S7-1-3, the image forming apparatus 100 may both print the image data using the document storage function and reprinting by marking. When the auto-deletion time of the document is 0, the status of the image data transfers to Status S7-2-1, as indicated by arrow K depicted in FIG. 12, so that the control panel 200 does not display the document. Even when the image forming apparatus 100 performs reprinting by marking, the control panel 200 does not display the document.

Therefore, the user may choose "Store only" or "Store and print" according to whether or not to redisplay the document which has undisplayed on the control panel 200.

An administrator and the like may preferably select in advance the transition indicated by arrow I or the transition indicated by arrow J according to the environment.

Therefore, in step S1503 depicted in FIG. 15, the output controller 102 refers to a setting of the image forming apparatus 100 and determines whether the status of the image data transfers to Status S7-1-2 in step S1504 or Status S7-1-3 in step S1505 according to the setting.

Figure 16:
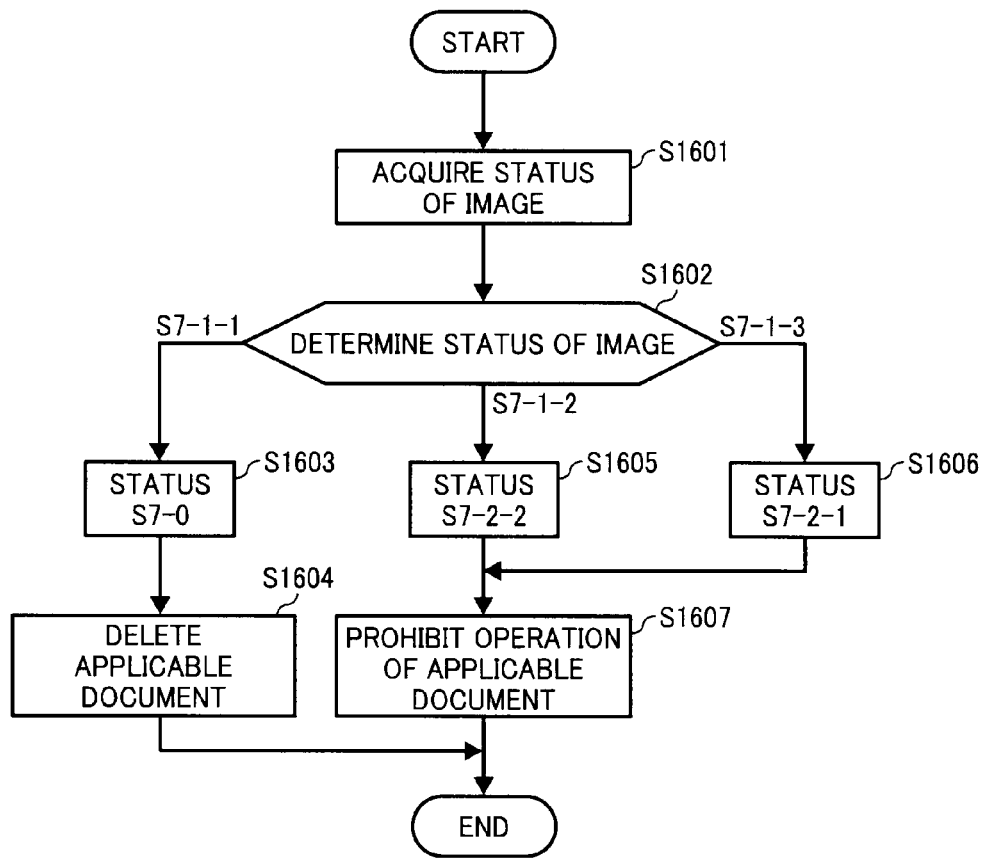
FIG. 16 is a flowchart illustrating a process of determination of a status of image data when an auto-deletion time is 0.

FIG. 16 is a flowchart illustrating a process of determination of the status of the image data when the auto-deletion time of the stored document is 0 according to the exemplary embodiment. The document manager 107 determines the status of the image data.

When the auto-deletion time of the document stored in the document management table becomes 0, the document manager 107 acquires the status of the image data from the image management table based on the EID number of the image data stored in the document management table in step S1601. In step S1602, the document manager 107 determines the status of the image data. When the status of the image data is Status S7-1-1, the status of the image data transfers to Status S7-0 in step S1603, so that the document manager 107 deletes the applicable document and the image data in step S1604. When the status of the image data is Status S7-1-2 or S7-1-3, the status of the image data transfers to Status S7-2-2 or S7-2-1 in step S1605 or S1606, respectively, so that the document manager 107 changes the flag value of the document to 0, so as not to display the applicable document on the control panel 200, thereby prohibiting operation of the document storage function in step S1607.

When the status of the image data is Status S7-2 (e.g., Status A7-2-1 or Status A7-2-2) depicted in FIG. 12 under a condition that the HDD 120 and the like have a storage capacity below a predetermined size, the image data to be deleted transfers to Status S7-0, as indicated by arrow D or G in FIG. 12, in which the image data is deleted. For example, the image data is deleted when the image data is of old date or left unused for more than a predetermined time period. Therefore, the document manager 107 sequentially deletes the image data until the HDD 120 and the like have a predetermined capacity. The above condition is one example of the second condition.

Accordingly, even when an image storage device (e.g., the image memory 121 depicted in FIG. 6) lacks its storage capacity, such deletion of the image data may supply the image storage device with additional storage capacity, so the image forming apparatus 100 may keep the document storage function and the marking printing function.

A description is now given of reprinting a document having two or more marks according to the above-described exemplary embodiment. The detector 105 may simultaneously or sequentially detect two or more marks applied to the image. When the detector 105 detects two or more marks, the image forming apparatus 100 may perform all print jobs corresponding to the marks at one time.

The output controller 102 may also determine a status transition of the image data as described above. However, when one piece of image data is in the status of S7-2-1 (depicted in FIG. 12), while another one piece of image data is in Status S7-2-2 (depicted in FIG. 12), only the one piece of image data in Status S7-2-1 may be printed using the document storage function, but the another one piece of mage data in Status S7-2-2 may not be printed using the document storage function because the another one piece of image data may not be displayed on the control panel 200.

When the image data in Status S7-2-1 has transferred from Status S7-1-3, the output controller 102 exceptionally determines to transfer the image data from Status S7-2-1 to Status S7-1-3, so that the image forming apparatus 100 may print the image data using the document storage function. Therefore, the image forming apparatus 100 may print both pieces of image data, which have been simultaneously printed, by using the document storage function, thereby preventing the user from being confused because only one piece of image data is redisplayed.

Since the status transition from S7-2-1 to S7-1-3 is exceptional, the transition is not illustrated in FIG. 12.

Figure 17:
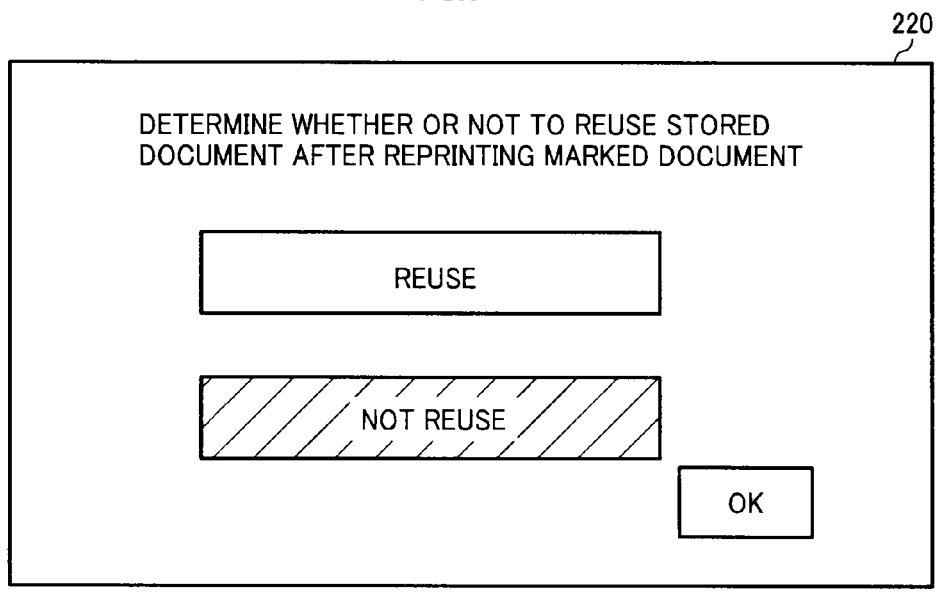
FIG. 17 is a schematic view of a confirmation screen displayed on the LCD touch panel shown in FIG. 3.

FIG. 17 is a schematic view of a confirmation screen displayed on the LCD touch panel 220 (depicted in FIG. 3). The confirmation screen makes the user confirm whether or not to reuse the stored document in using the document storage function. The LCD touch panel 220 displays a message "CHOOSE WHETHER OR NOT TO REUSE STORED DOCUMENT AFTER REPRINTING MARKED DOCUMENT" and two keys for choosing to reuse or not reuse the stored document. Therefore, the user may choose whether or not to redisplay the document on the control panel 200.

Alternatively, the confirmation screen may not be displayed when redisplaying the stored document is inappropriate.

According to the above-described exemplary embodiment, since the image forming apparatus 100 may provide both the document storage function and the marking printing function, the image forming apparatus 100 may store image data shared by the above two functions and delete the image data under conditions according to the respective functions.

The above-described exemplary embodiment may be preferably applied to an image forming apparatus using two or more image management methods.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

As can be appreciated by those skilled in the art, although the present invention has been described above with reference to specific exemplary embodiments the present invention is not limited to the specific embodiments described above, and various modifications and enhancements are possible without departing from the spirit and scope of the invention. It is therefore to be understood that the present invention may be practiced otherwise than as specifically described herein. For example, elements and/or features of different illustrative exemplary embodiments may be combined with each other and/or substituted for each other within the scope of the present invention.

What is claimed is:

1. An image forming apparatus, comprising:
an image input device configured to input image data;
an image storage device configured to store the image data;
an image output device configured to output the image data;
an operation device configured to command control of the image data;
a first document manager configured to store the image data input by the image input device in the image storage device, associate the image data stored in the storage device with a first identifier, output the image data associated with the first identifier via the image output device when the first identifier is specified via the operation device, and delete the image data associated with the first identifier from the image storage device when a first condition is satisfied;

a second document manager configured to associate the image data to be output by the image output device with a second identifier, output the second identifier applied to the image data via the image output device, and output the image data associated with the second identifier via the image output device when the second identifier is input via the image input device; and a detector that detects one or more second identifiers on image data, wherein when the detector detects two or more second identifiers on an image, the image forming apparatus prints all image data corresponding to the two or more second identifiers at once, and wherein the first document manager is configured such that, when the image data is associated with both the first identifier and the second identifier, the first document manager does not delete the image data from the image storage device and prohibits the first identifier from being specified via the operation device.

2. The image forming apparatus according to claim 1, wherein the second document manager deletes the image data associated with the second identifier from the image storage device when a second condition is satisfied.

3. The image forming apparatus according to claim 1, wherein, when the second document manager associates the image data to be output by the image output device with the second identifier and when the image data is not already stored in the image storage device, the second document manager stores the image data in the image storage device.

4. The image forming apparatus according to claim 1, wherein, when the operation device displays the first identifier associated with the image data stored in the image storage device and determines that the first identifier is specified when the first identifier is selected by a user, the first document manager changes a display status of the first identifier on the operation device in order to prohibit the first identifier from being specified via the operation device.

5. The image forming apparatus according to claim 1, wherein, when the first document manager prohibits the first identifier from being specified via the operation device and when the second document manager outputs the image data, the first document manager changes a display status of the first identifier to permit the first identifier to be specified via the operation device.

6. The image forming apparatus according to claim 5, wherein, when the second document manager outputs the image data for which the first identifier is prohibited from being specified via the operation device and when the image data is both associated with the first identifier by the first document manager and associated with the second identifier by the second document manager, the first document manager changes a display status of the first identifier to permit the first identifier to be specified via the operation device.

7. The image forming apparatus according to claim 6, wherein, when the image input device inputs a plurality of second identifiers and when at least one piece of image data associated with the second identifiers is both associated with the first identifier by the first document manager and associated with the second identifier by the second document manager, the first document manager changes a display status of the first identifier to permit the first identifier to be specified via the operation device for the image data related to all of the second identifiers.

8. The image forming apparatus according to claim 5, wherein the first document manager determines whether or not to permit the first identifier to be specified via the operation device according to a user's choice.

9. An image forming method, comprising:
inputting image data;
storing the image data;
outputting the image data;
commanding control of the image data;
performing a first control including
storing the input image data;
associating the stored image data with a first identifier;
outputting the image data associated with the first identifier when the first identifier is specified by commanding control of the image data; and
deleting the image data associated with the first identifier when a first condition is satisfied;
performing a second control including
associating the output image data with a second identifier;
outputting the second identifier applied to the image data; and
outputting the image data associated with the second identifier when the second identifier is input;
detecting one or more second identifiers on image data;
printing all image data corresponding to two or more second identifiers at once when a detector detects the two or more second identifiers on image data, and
when the image data is associated with both the first identifier and the second identifier, not deleting the image data associated and stored with the first identifier and prohibiting the first identifier from being specified by commanding control of the image data.

10. A computer readable storage medium including computer executable instructions, which when executed by a processor, cause the processor to perform a control method comprising:
inputting image data;
storing the image data;
outputting the image data;
commanding control of the image data;
performing a first control including
storing the input image data;
associating the stored image data with a first identifier;
outputting the image data associated with the first identifier when the first identifier is selected by commanding control of the image data; and
deleting the image data associated with the first identifier when a first condition is satisfied;
performing a second control including
associating the output image data with a second identifier;
outputting the second identifier applied to the image data; and
outputting the image data associated with the second identifier when the second identifier is input;
detecting one or more second identifiers on image data;
printing all image data corresponding to two or more second identifiers at once when a detector detects the two or more second identifiers on image data, and
when the image data is associated with both the first identifier and the second identifier, not deleting the image data associated and stored with the first identifier and prohibiting the first identifier from being specified by commanding control of the image data.

11. The image forming apparatus according to claim 1, further comprising a command panel that allows a user to choose whether to redisplay image data associated with the second identifier for selection in the operation device after the image data has been output.

12. The image forming method according to claim 9, further comprising providing a command panel that allows a user to choose whether to redisplay image data associated with the second identifier for selection in an operation device after the image data has been output.

13. The control method according to claim 10, further comprising providing a command panel that allows a user to choose whether to redisplay image data associated with the second identifier for selection in an operation device after the image data has been output.

* * * * *